United States Patent [19]

Conrad

[11] 4,126,034
[45] Nov. 21, 1978

[54] METHOD AND APPARATUS FOR CONTAINER PRESSURE TESTING

[75] Inventor: William A. Conrad, Pinole, Calif.

[73] Assignee: Rheem Manufacturing Company, New York, N.Y.

[21] Appl. No.: 873,096

[22] Filed: Jan. 30, 1978

[51] Int. Cl.² .............................................. G01M 3/32
[52] U.S. Cl. ........................................ 73/49.2; 73/49.8
[58] Field of Search ................ 73/40, 49.2, 49.3, 49.8

[56] References Cited

U.S. PATENT DOCUMENTS

| 679,487 | 7/1901 | Tuttle | 73/49.2 |
|---|---|---|---|
| 2,467,767 | 4/1949 | Mertler | 73/40 |
| 2,749,743 | 6/1956 | Foster | 73/49.3 |
| 2,833,141 | 5/1958 | Holm | 73/40 |
| 2,880,610 | 4/1959 | McCoy | 73/49.2 |
| 3,028,750 | 4/1962 | Rondeau | 73/49.2 |
| 3,306,097 | 2/1967 | Wimmer | 73/49.2 |
| 3,447,946 | 6/1969 | Roe, Jr. | 73/49.2 X |
| 3,672,208 | 6/1972 | Pearce | 73/49.2 |
| 3,762,212 | 10/1973 | Morley et al. | 73/49.2 X |
| 3,987,664 | 10/1976 | Hass et al. | 73/49.2 |
| 4,012,945 | 3/1977 | Bergstrand | 73/49.2 |
| 4,025,371 | 5/1977 | Pecha | 73/40 X |

FOREIGN PATENT DOCUMENTS 1,273,379  5/1972  United Kingdom .................... 73/49.3

Primary Examiner—John Petrakes
Attorney, Agent, or Firm—Watson, Leavenworth, Kelton & Taggart

[57] ABSTRACT

Containers having top head openings are inserted axially without prealignment into a test chamber which houses a sealing member having a sealing surface radially continuous about the container insertion axis. The container interior and the extent of the test chamber encircling the container are commonly pressurized and the sealing device is displaced to seal the container openings. The encircling test chamber extent is then vented to atmospheric pressure and pressure change in the test chamber is monitored.

11 Claims, 7 Drawing Figures

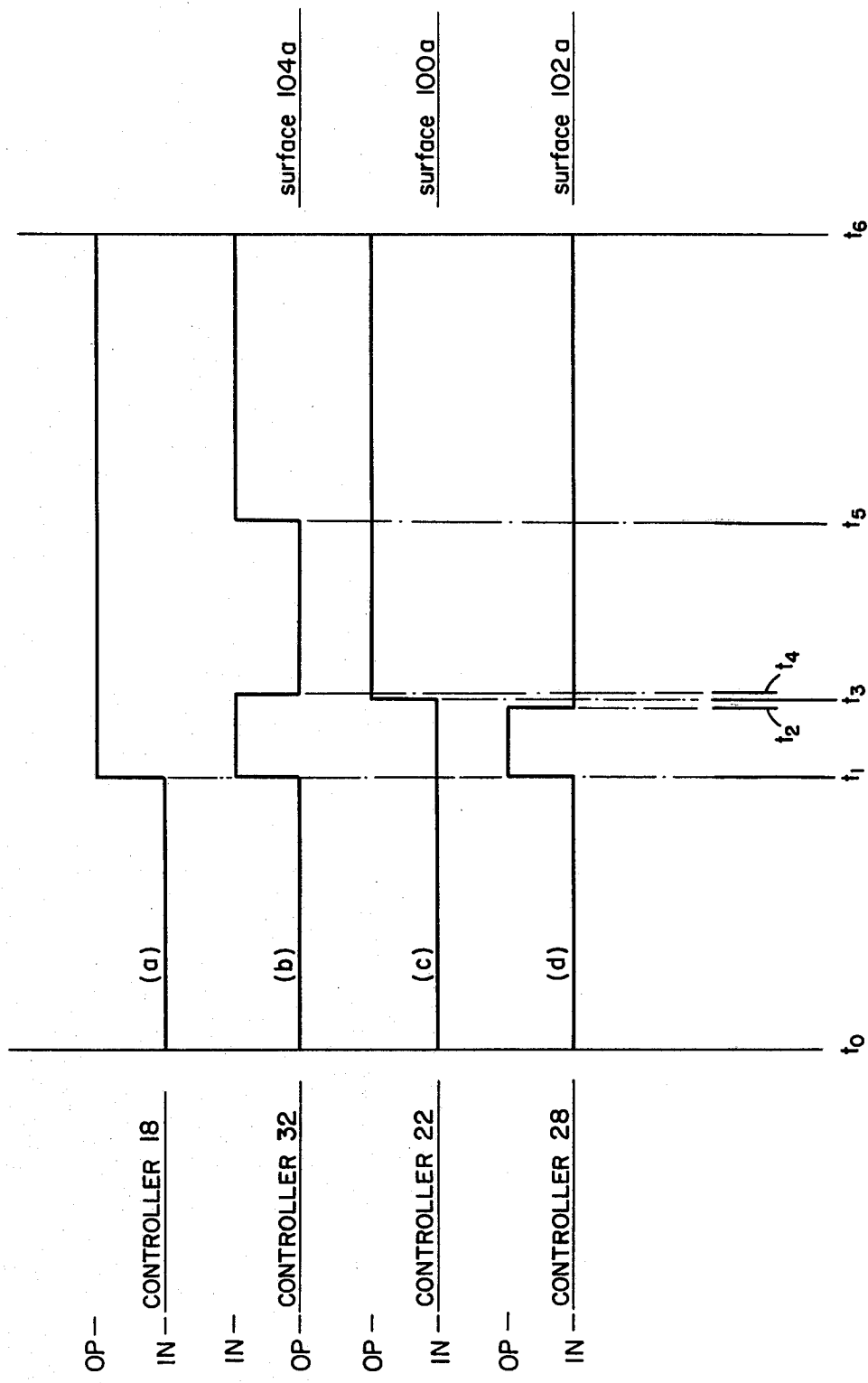

METHOD AND APPARATUS FOR CONTAINER PRESSURE TESTING

FIELD OF THE INVENTION

This invention relates to apparatus and method for testing containers and more particularly to high speed leakage testing of shipping drums and the like.

BACKGROUND OF THE INVENTION

Conventional testing practices in the drum and pail container industry generally test for assurance of leakproof quality of container bodies, bottoms and head double seam. Known practices, to the extent that they go beyond the forgoing testing of container parts to further assure that the head end of the container is leakproof, are constrained to procedures involving alignment of the test apparatus with container access ports and are further encumbered, where a high measure of leakproof character is desired to be tested, by complex pressure detection subsystems.

SUMMARY OF THE INVENTION

It is an object of the present invention to provide improved apparatus and methods for container testing.

A more specific object of the invention is to provide a system for expeditious pressure testing of containers without time loss attendant on container alignment and without detection subsystem complexity.

In attaining the foregoing and other objects, the invention provides apparatus and system comprising a test chamber having an open end for receiving a container, insertion means operable for advancing the container through such open end into a passage within the test chamber and for sealing the test chamber open end, sealing means for defining, within the test chamber, a sealing surface radially continuous with respect to the chamber passage axis and operable for translation in the passage into confronting sealing relation with the container head access port, test chamber venting means and a control system adapted for successively operating the insertion means, pressurizing the entirety of the test chamber passage, operating the sealing means, and for operating the venting means for a predetermined time period. A detection device thereafter detects pressure change in the test chamber passage. By its provision of such radially continuous sealing surface, the invention permits insertion of a container into the test chamber passage without prealignment therebetween. Thus, the container access port or ports confront the sealing surface irrespective of port angular location. By commonly pressurizing the container and the remaining portion of the passage not occupied by the container, the invention avoids need for temperature or other compensation of pressure differentials detected in the test chamber passage.

The foregoing and other objects and features of the invention will be evident from the following detailed description thereof and from the drawings wherein like reference numerals identify like parts throughout.

DESCRIPTION OF THE DRAWINGS

FIG. 7 is a timing diagram of system operation.

DESCRIPTION OF THE PREFERRED EMBODIMENTS

Figure 1:
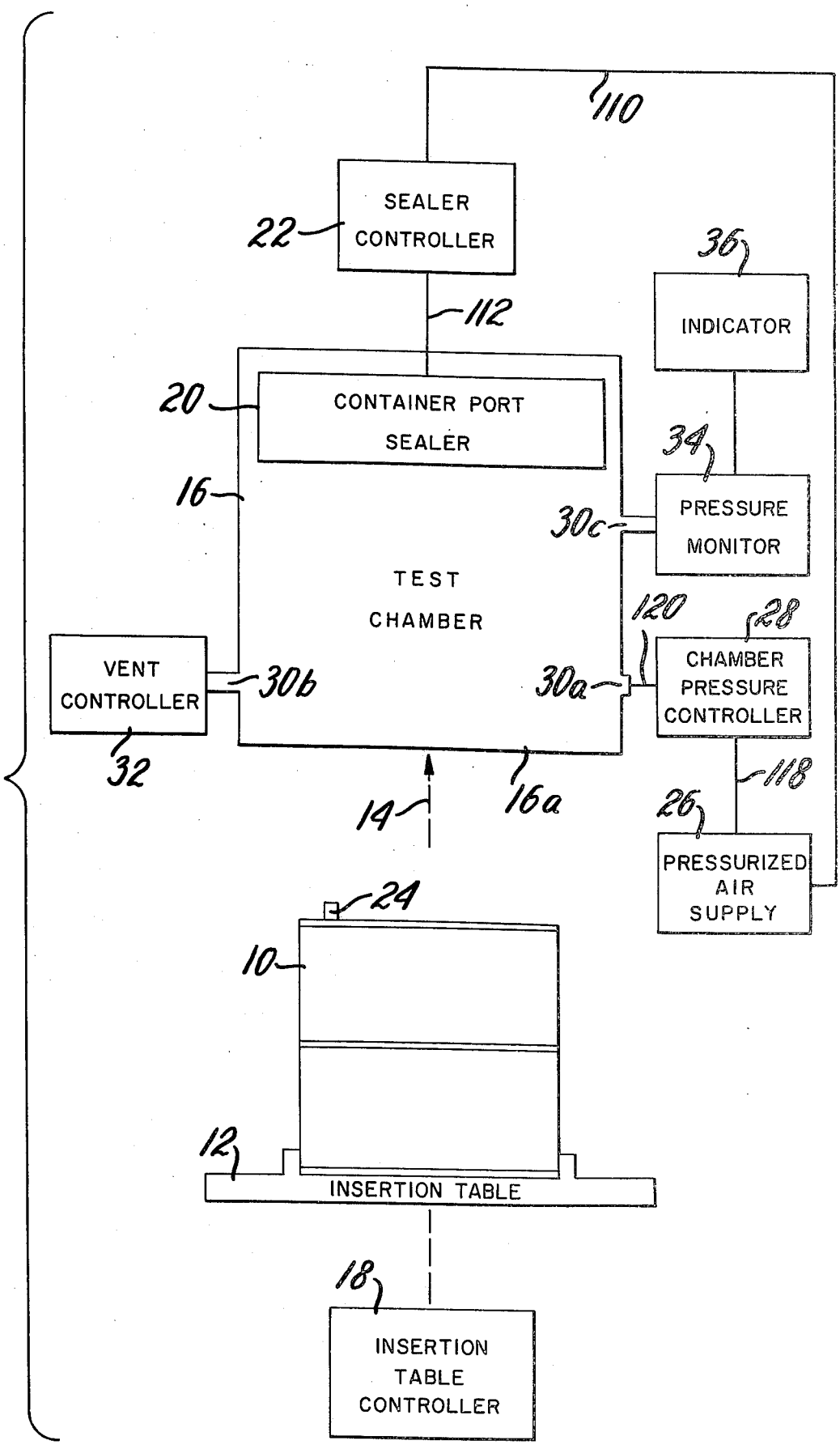
FIG. 1 is a functional block diagram of the system of the invention.

Referring to the functional block diagram of FIG. 1, container 10 is shown upright on insertion table 12 in position for advancement along axis 14 into a passage formed in test chamber 16. Insertion table controller 18 may comprise an actuating air cylinder whose output shaft is operative to displace table 12 into sealing engagement with the open end 16a of test chamber 16, so as to sealably close the chamber about inserted container 10 and define an airtight volume housing the container. The container-receiving passage of test chamber 16 is of cross-sectional dimensions exceeding that of container 10 so as to include an extent circumscribing the inserted container. Interiorly of test chamber 16 is situated container port sealer 20 which is displaceable by sealer controller 22 along axis 14, whereby access port or bung hole 24 of container 10 may be sealably closed.

Pressurized air supply 26 communicates with test chamber 16 through chamber pressure controller 28 and chamber port 30a for pressuring the test chamber. Vent controller 32 communicates with test chamber 16 through chamber port 30b for creating a pressure differential between the container and the encircling extent of the test chamber passage, for purposes discussed below. Pressure monitor 34 senses changes in pressure through chamber port 30c and provides output indication thereof via indicator 36.

In operation of the system of FIG. 1, sealer controller 22 is inactive during an insertion phase wherein controller 18 drives table 12 into sealed relation with test chamber 16 and inserts container 10 therein for test evaluation. Following the insertion phase, pressure controller 28 is operated, permitting supply 26 to pressurize in common both chamber 16 and the interior or container 10 to a preselected pressure level. At the close of such pressurization phase, sealer controller 22 is operated, causing sealer 20 to close port 24 of the container. After such sealing phase, vent controller 22 is operated for a preselected time period, whereby the extend of the test chamber passage external to container 10 and previously pressurized therewith, is set to a predetermined different pressurization level, for example, atmospheric pressure. Upon inactivation of vent controller 32, pressure monitor 34 provides output indication of pressure departure from such predetermined pressure level.

In the case of a faulty container, the container acts as a pressurized air source in communication with the encircling extend of test chamber 16, thereby altering the pressure level therein. The threshold level of pressure monitor 34 may be set such that indicator 36 is actuated only upon pressure change of given magnitude from such predetermined pressure level.

Figure 2:
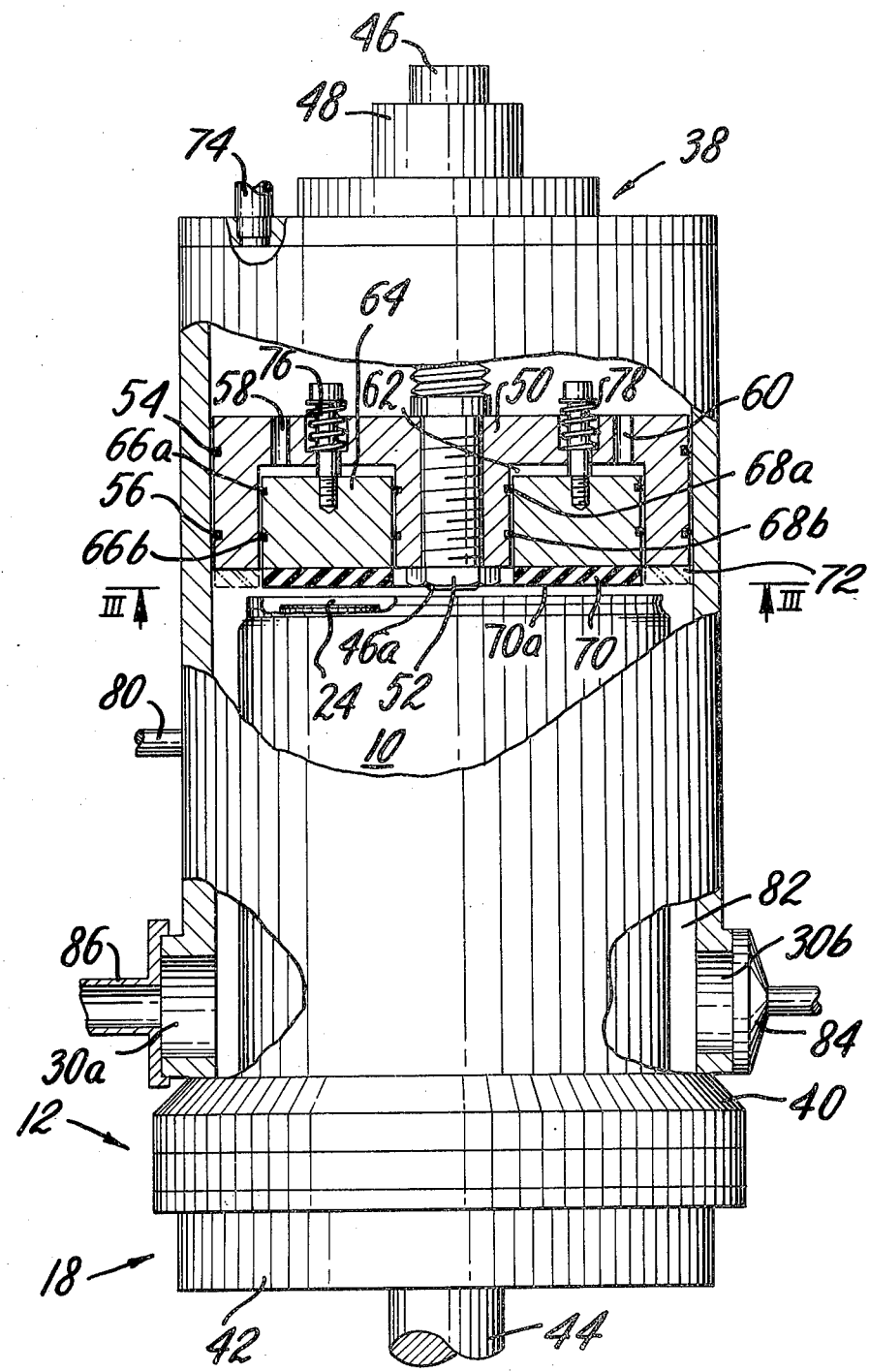
FIG. 2 is a front elevational view of a first embodiment of the FIG. 1 test chamber, partly broken away and partly sectioned to show detail.
Figure 3:
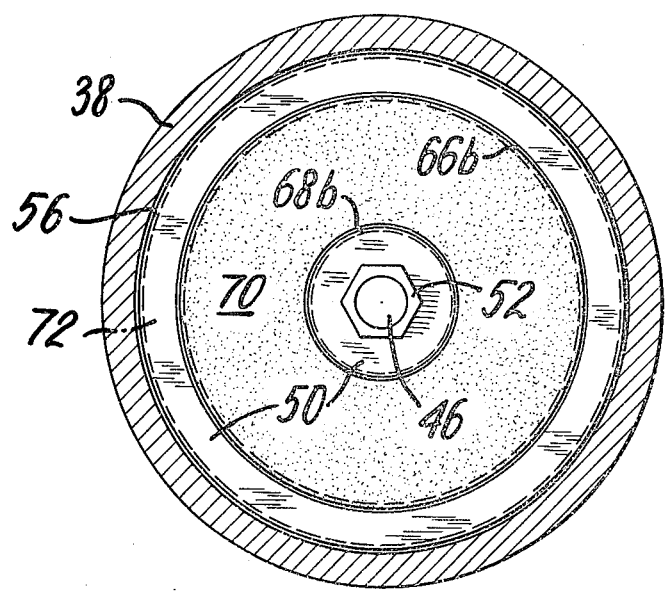
FIG. 3 is a sectional view as seen from plane I—I of FIG. 2.

Referring to FIGS. 2 and 3, elongate cylindrical test chamber housing 38 is shown with its lower open end sealably closed by gasket 40 of insertion table 12, the pressure plate 42 and ram shaft 44 of insertion table controller 18 being shown below table 12. At its upper end housing 38 has shaft 46 extending through collar 48 into the housing interior and supporting therein for longitudinal translation outer slidable member 50, member 50 being secured to shaft threaded end 46a as by interiorly threaded securement 52. Member 50 is encircled by sealing rings 54 and 56 which also engage the interior wall of housing 38 facilitating movement of member 50 without passage of pressurized air therebeyond. Member 50 defines pressure conduits 58 and 60 extending from its upper surface to an annular cavity 62 formed in the lower portion of member 50. Cavity 62 supports therein for axial translation an inner slidable member in the form of a donut-shaped piston 64. Sealing rings 66a, b and 68a, b encircle respective exterior and interior surfaces of the piston to facilitate sliding movement thereof relative to member 50 without passage of air therebeyond. At its lower extremity, piston 66 has secured thereto gasket 70 defining radially continuous port-confronting sealing surface 70a. Gasket 70 is comprised of a resilient material suitable for leak-proof sealing of access port 24 of container 10. Member 50 supports phantom-shown gasket 72 at its lower end for resiliently engaging the periphery of the container top head in optional use of the apparatus for open head container testing discussed below.

In use of apparatus of FIGS. 2 and 3, the size of containers to be tested is initially determined. Shaft 46 is then released from collar 48 such that it may be displaced and in turn establish member 50 at an appropriate vertical elevation within housing 38. On subsequent securement of shaft 46 in collar 48, pressurized air admitted upwardly of member 50 through housing inlet fitting 74, during the above-noted sealing phase, is conducted through conduits 58 and 60 and displaces piston 64 against the restraint of springs 76 and 78, which are seated in member 50 and secured to piston 64. Gasket 70 accordingly urges sealing surface 70a downwardly into confronting engagement with the access port or ports of container 10.

A further fitting 80 on housing 38 permits the furnishing of pressurized air into container 10 and into the extend 82 of the housing 38 passage circumscribing the container. Passage extent 82 further communicates with port 30b, which may be open (vented) or closed depending upon the state of poppet valve 84, and through port 30c with pressure monitoring fitting 86.

Figure 4:
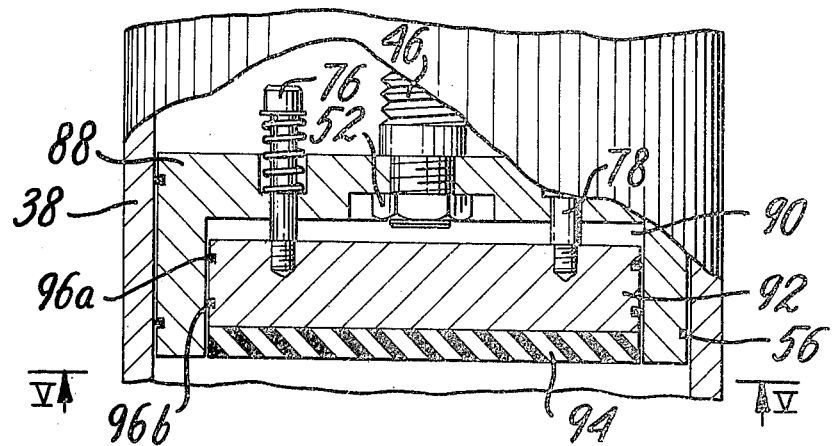
FIG. 4 is counterpart to FIG. 2 in illustrating a second test chamber embodiment.
Figure 5:
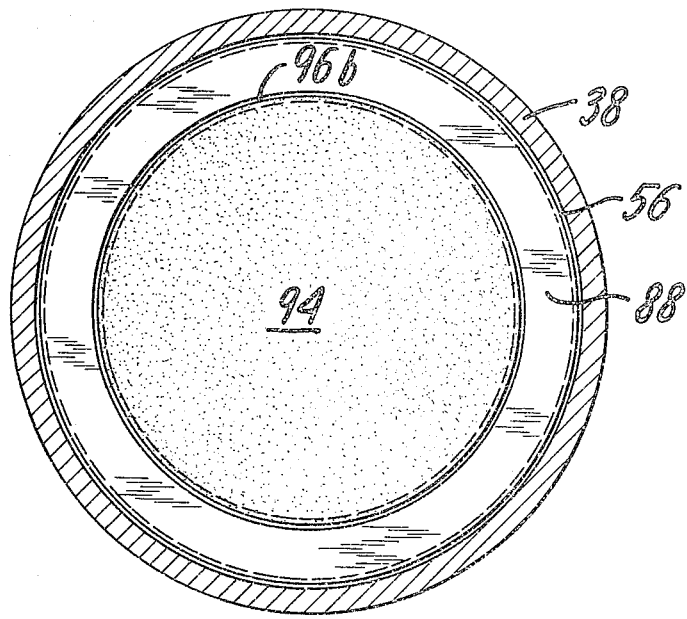
FIG. 5 is a sectional view as seen from plane V—V of FIG. 4.

In FIGS. 4 and 5, test chamber 38 is outfitted with a modified version of container port sealer. Outer slidable member 88 is again fixed by securement 52 to shaft 46 but now defines a fully cylindrical cavity 90 at its lower end. Piston 92 is fully cylindrical and has disc-shaped port-confronting gasket 94 secured thereto. Sealing rings 96a, b encircle piston 92.

Figure 6:
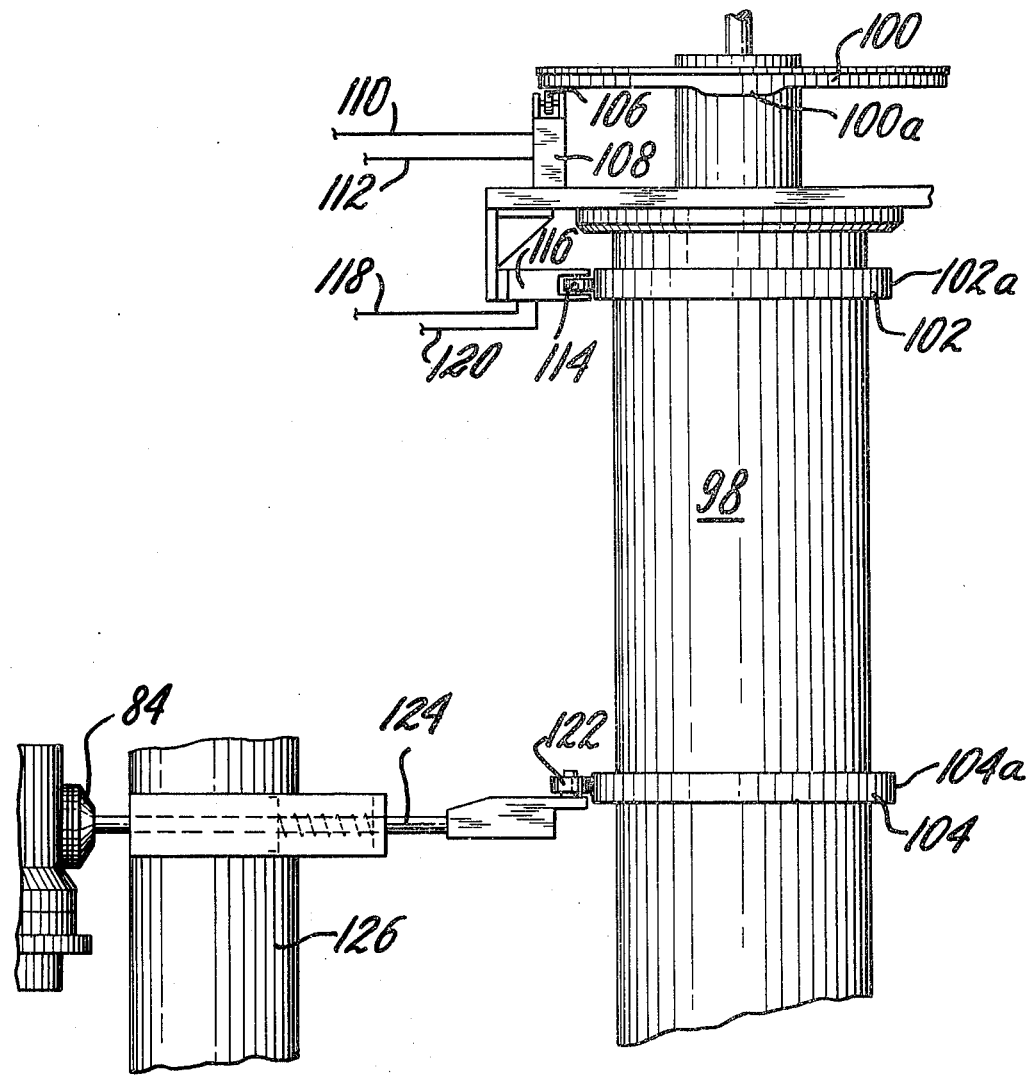
FIG. 6 is a front elevational view of one embodiment of the controller apparatus of the FIG. 1 system.

Turning to FIG. 6, cylindrical housing 98 supports circular cams 100, 102 and 104 for rotation therewith. Cam 100 defines a camming surface 100a disposed horizontally in engagement with cam-following roller 106, which operates valve 108 to provide communication between lines 110 and 112, connected as shown in FIG. 1. These elements comprise an embodiment of sealer controller 22 of FIG. 1.

Cam 102 has camming surface 102a disposed vertically in engagement with cam-following roller 114, which operates valve 116 to provide communication between lines 118 and 120, connected as shown in FIG. 1. These elements comprise an embodiment of chamber pressure controller 28 of FIG. 1.

Cam 104 has camming surface 104a disposed vertically in engagement with cam-following roller 122, which drives control rod 124 of poppet valve 84. Rod 124 is spring-biased in housing 126 and thereby urged into engagement with surface 104a. These elements comprise an embodiment of vent controller 32 and the entirety of elements shown in FIG. 6 comprise a control system for practice of the testing method of the subject invention.

FIG. 7 shows a full test cycle in accordance with the invention as against a time base commencing at time $t_0$ and ending at $t_6$, corresponding to a single revolution of cylindrical housing 98 of FIG. 6. As seen in part (a) of FIG. 7, controller 18 is inactive (IN) from $t_0$ to $t_1$ and is operated (OP) at $t_1$, whereby table 12 (FIG. 1) is advanced into sealing relation with the test chamber open end. This insertion operation may be accomodated by a further camming surface on housing 98 configured to have a controller-operative part for angular rotation corresponding to $t_1$ through $t_6$ for operating controller 18.

The remaining individual timing diagrams in parts (b), (c) and (d) of FIG. 7 respectively identify the configuration of camming surfaces 104a, 100a and 102a.

Considering part (d) of FIG. 7, controller 28 is operated at $t_1$, concurrently with completion of the insertion of the container, and remains operated until $t_2$ (pressurization phase) thereby pressurizing the test chamber passage and container interior. Controller 28 is otherwise inactivated throughout the test cycle. Camming surface 102a accordingly is configured to have a controller-operative part only for angular rotation of housing 98 corresponding to $t_1$ through $t_2$.

Following such pressurization phase, and as is shown in part (c) of FIG. 7, controller 22 is operated at $t_3$ whereby the container port is sealably closed. This condition (sealing phase) applied throughout the remainder of the test cycle and camming surface 100a accordingly is configured to have a controller-operative part for angular rotation of housing 98 corresponding to $t_3$ through $t_6$.

Ater commencement of the sealing phase, and as is shown in part (b) of FIG. 7, controller 32 is operated at $t_4$ whereby poppet value 84 (FIG. 6) withdraws under spring bias for its sealing relation to the test chamber. This condition (venting phase) applies until $t_5$, at which time controller 32 is inactivated and the poppet valve recloses. Since the container is sealed during $t_4$–$t_5$, only the extent of the test chamber passage circumscribing the container is subjected to pressure change.

To facilitate container insertion, controller 32 is also operated during $t_0$–$t_1$, as also shown in part (b) of FIG. 7. The controller is inactivated from $t_1$ through $t_2$ and $t_3$, such that the poppet valve is closed throughout the pressurization and sealing phases and is also inactivated from $t_5$ to $t_6$, i.e., during the pressure change monitoring (test) phase. Camming surface 104a accordingly is configured to have controller-operative parts for angular rotation of housing 98 corresponding to $t_1$ through $t_4$ and $t_5$ through $t_6$.

As will be seen from the foregoing, the method and system of the invention readily lend themselves to on-line high speed testing, particularly through eliminating need for alignment of container access ports and test apparatus by use of sealing devices, e.g., members 70 and 94, of configuration radially continuous with respect to the test chamber passage and translatable therein to confront the container access ports. In a further aspect, advantage resides in common pressurization of the container interior and encircling test chamber passage extent, whereby temperature correction of detached test pressure change is unnecessary.

In the above-noted optional use of the FIG. 2 apparatus for the testing of open-headed containers, pressurized air admitted through housing inlet fitting 74 is cut off, thus deactivating piston 64 from its axial stroke. Introduction of pressurized air into the test chamber takes place through hollow shaft 46. Member 50 is adjusted in position to effect an airtight seal as gasket 72 engages the top curl portion of the inserted container. Testing may now proceed as above-discussed for closed-headed containers.

Various modifications may evidently be introduced in the foregoing without departing from the invention. For example, while positive pressure is contemplated above, negative pressurization may be employed in the pressurization phase and pressure drop may be monitored in the test phase. In the venting phase, one may vent to a predetermined pressure level other than atmospheric pressure. While the embodiments of the container port sealer depicted in the drawings include translatory drive members, the invention of course contemplates other measures for effecting container port sealing, for example, inflatable members and the like. Accordingly, the particularly disclosed embodiments and practices are intended in an illustrative and not in a limiting sense. The true spirit and scope of the invention is set forth in the following claims.

What is claimed is:

1. A method for testing for air tightness a container having a head inclusive of an access port, comprising the steps of:
    (a) disposing said container in an airtight axially extending passage having an extent encircling said container; then
    (b) commonly pressurizing the interior of said container and such encircling passage extent to a preselected pressure level; then
    (c) sealing said container; then
    (d) establishing in said encircling passage extent a predetermined pressure level diverse from said preselected pressure level; and then
    (e) detecting and indicating the measure of pressure level change in said encircling passage extent from said predetermined pressure level.

2. The method practiced in claim 1 wherein said step (d) is practiced by placing said test volume in communication with medium pressurized at said predetermined pressure level for a preselected time period following practice of said step (c) and discontinuing such communication between said airtight volume and such pressurized medium prior to practice of said step (e).

3. The method claimed in claim 2 wherein said pressurized medium is atmospheric air.

4. The method claimed in claim 1 wherein said preselected pressure level is a positive pressure level.

5. The method claimed in claim 4 wherein said predetermined pressure level is a positive pressure level of magnitude less than said preselected pressure level.

6. A system for testing for air tightness a container having a head inclusive of an access port, comprising:
    (a) test chamber means defining an open end and an axial passage extending from said open end for receiving said container;
    (b) support means operable for advancing said container axially within said passage and thereupon sealing said chamber open end;
    (c) test chamber pressurizing means operable for establishing a preselected pressure level in said passage;
    (d) sealing means for defining a sealing surface radially continuous with respect to the axis of said test chamber means passage and operable for axial translation in said test chamber means for moving said sealing surface into confronting sealing relation with said container access port;
    (e) vent means operable to establish in said passage a predetermined pressure level diverse from said preselected pressure level;
    (f) control means for successively operating said support means, said pressurizing means, said sealing means, and said vent means; and
    (g) detector means for indicating pressure change in said passage.

7. The system claimed in claim 6 wherein said sealing means comprises a first member supported by said test chamber means for movement axially of said passage and a second member supported by said first member for movement relative thereto and axially of said passage, said second member defining said sealing surface.

8. The system claimed in claim 7 including first positioning means for displacing said first member into given axial locations within said test chamber and releasably retaining said first member in such axial locations.

9. The system claimed in claim 8 including second positioning means for displacing said second member with respect to said first member thereby to move said sealing surface thereof into sealing relation with said container.

10. The system claimed in claim 6 wherein said vent means includes a valve member in sealing relation to said passage during inactivation of said vent means and in venting relation to said passage during operation of said vent means.

11. The system claimed in claim 10 wherein said control means inactivates said pressurizing means and said vent means successively and operates said sealing means prior to such inactivating of said vent means.

* * * * *

UNITED STATES PATENT AND TRADEMARK OFFICE
CERTIFICATE OF CORRECTION

PATENT NO. : 4,126,034
DATED : November 21, 1978
INVENTOR(S) : William A. Conrad It is certified that error appears in the above—identified patent and that said Letters Patent are hereby corrected as shown below:

At column 2, line 46, "interior or container" should read --interior of container--.

At column 2, line 51, "the extend of" should read --the extent of--.

At column 2, line 60, "extend of test" should read --extent of test--.

At column 3, line 43, "extend 82" should read --extent 82.

Signed and Sealed this

*Twelfth* Day of *June 1979*

[SEAL]

Attest:

RUTH C. MASON
*Attesting Officer*

DONALD W. BANNER
*Commissioner of Patents and Trademarks*